United States Patent [19]

Holt et al.

[11] 3,972,722

[45] Aug. 3, 1976

[54] ALUMINA-ZIRCON BOND FOR REFRACTORY GRAINS

[75] Inventors: John P. Holt, Ladue; Theodore Paul Cash, Bonne Terre; Delbert E. Day, Rolla, all of Mo.

[73] Assignee: Valley Mineral Products Corporation, St. Louis, Mo.

[22] Filed: Mar. 4, 1974

[21] Appl. No.: 447,657

[52] U.S. Cl. .................................... 106/57; 106/65
[51] Int. Cl.² .................. C04B 35/10; C04B 35/48
[58] Field of Search ........................................ 106/57

[56] References Cited
UNITED STATES PATENTS

| | | | |
|---|---|---|---|
| 2,830,348 | 4/1938 | Busby et al. | 106/57 |
| 2,842,447 | 7/1958 | Schiotzhauer et al. | 106/57 |

*Primary Examiner*—J. Poer
*Attorney, Agent, or Firm*—Gravely, Lieder & Woodruff

[57] ABSTRACT

This disclosure concerns a thermo-chemical bonded refractory product which comprises inactive refractory grains bonded together by mullite. The refractory is emplaced in a furnace or other pyro-processing unit by pressing, ramming, gunning, casting, etc. The refractory product is made by mixing inactive refractory grains with a mixture of zircon and alumina powders and a small amount of an alkaline earth oxide catalyst. The catalyst breaks the zircon down into $ZrO_2$ and $SiO_2$ at relatively low temperatures. The $SiO_2$ thus liberated is unusually reactive and reacts with the alumina to form mullite and the $ZrO_2$ adsorbs the alkaline earth oxide.

8 Claims, No Drawings

ALUMINA-ZIRCON BOND FOR REFRACTORY GRAINS

BACKGROUND OF THE INVENTION

A continuing problem in the production of refractories designed for emplacement by ramming, gunning, shovelling or casting is that they must be consolidated into monoliths by firing to produce sintering or partial melting of the mass. In order that this melting will not continue during subsequent service, refractories must be designed so that sintering will stop after a given time at temperature, or refractories must be used whose sintering temperatures exceed the furnace operating temperature.

A commonly used method of providing controlled sintering at operating temperatures is to take advantage of the fact that finely communited refractory grains tend to sinter below their fusion temperatures. The disadvantages are that the sintered zone usually is quite thin and the time for sintering is usually burdensomely prolonged.

Recourse to using grains whose sintering temperature is above the normal operating temperature of the furnaces they are used in results in some other disadvantages. Among these are the following: (1) most metallurgical furnaces are commonly operated at temperatures which are limited not by the monolithic refractories usually used in their hearths, but by the maximum service temperature of exposed brickwork in the furnace walls and roofs, therefore, little or no sintering of the refractory grains in the hearths would take place. Even among the rare cases where such sintering can be made to occur, the sintered face would be relatively thin and normal erosion would sooner or later expose unconsolidated grains which would simply fall (or float) out of place, (2) electric arc, electric induction and basic oxygen furnaces derive their heat by generating it within the metallic charge. Heating these furnaces to temperatures above their normal operating temperatures before putting them in service is, at best, time consuming, awkward, and expensive, and sometimes virtually impossible.

To a degree, chemically bonded (unfired) brick is subject to the same disadvantages.

Recently, some thermo-chemical approaches have provided individual solutions. These involve preparation of refractory mixes or bodies, which in the unfired state or in normal atmospheres remain granular or plastic — or simply 'glued' together by adhesives or cements. These materials, upon firing to temperatures at or below normal operating temperatures or exposed to other than normal atmospheres, react to form chemical species which are stable at temperatures well above the temperatures at which they will be required to serve. To be successful the new, thermally-stable chemical species must hold the mass together. This can be accomplished by polymerization, by direct chemical combination of two or more different substances which were formerly physically separate, or by development of a continuous, stable and strong matrix which can adhere to and thus hold together large grains (aggregate) of inactive refractory materials.

SUMMARY OF THE INVENTION

The present invention involves a refractory composition which, when fired at a temperature of about 2900°F. forms a mullite matrix to provide a refractory monolith serviceable to temperatures of 3300°F. or higher. The monolith comprises large refractory grains bonded together by mullite.

DETAILED DESCRIPTION OF THE INVENTION

This invention relates to an improvement in the formulations of granular refractories used for gunning or ramming emplacement in pyro-processing units. The formulation includes a bonding agent which forms spontaneously at temperatures well below its own melting point so that high temperature pre-firing, i.e. prefiring above the normal operating temperature of the pyro-processing unit in which the composition is used, is not necessary.

The composition comprises from about 30% to about 80% by weight inert refractory grog of about 4 to about 70 mesh in size; from about 6% to about 20% by weight zircon ($ZiO_2 \cdot SiO_2$) of about 90% to about 100% minus 200 mesh size; and about 5% to about 45% by weight alumina ($Al_2O_3$) of about 90% to about 100% smaller than 325 mesh size, and from about 5% to 15% silica of about 90% to about 100% minus 325 mesh size. A small amount of alkaline earth oxide is used in the composition as a catalyst to break down the zircon into its compound oxides, $ZrO_2$ and $SiO_2$. From about 0.5% to about 10% by weight of the composition is alkaline earth oxide, preferably magnesium oxide or calcium oxide. If magnesium oxide is used, it can be in the form of ground light burned magnesia or ground dead burned magnesite.

The silica released from the zircon is in a very reactive form and combines with the alumina powder to form mullite, with a highly stable bond. The alkaline earth oxide in turn is absorbed into the zirconia to form such stable compounds as magnesium zirconate or calcium zirconate.

The preferred refractory grain used in this invention is fused zircon grains or tabular alumina aggregate, but other coarse refractory grains can be bonded in like manner. The only requirement is that the refractory grain to be bonded not react in an adverse manner with the alumina-zircon bond to form compounds which melt at low temperatures. Typical refractory grains which can be bonded in the manner of this invention are fused zirconia, fused zirconia-alumina-silica, pyrophyllite, fused alumina, and fused mullite.

If desired, up to about 15% by weight of a chemical binder can be added to the mixture. This is used to form a chemical setting material which will hold the refractory in position until the mullite bond is formed after heating.

If alumina is present in the composition from about 5% to about 15% of fine silica (preferably minus 325 mesh) is added to prevent the formation of low melting eutectics between the zircon and alumina. If all alumina grog is used, then more than about 11% ground silica must be added to the composition.

The following example, Example No. 1, demonstrates that the presence of the catalyst, magnesite (a typical alkaline earth oxide), is essential to the formation of mullite when zircon and alumina are present.

EXAMPLE NO. 1

Amounts of finely comminuted alumina and zircon were chosen so that the mole ratio of $Al_2O_3$ to $SiO_3$ in the batch was 3 to 2, which is equal to the mole ratio of $Al_2O_3$ to $SiO_2$ in mullite. To each of the mixes sufficient chemical binder solution (aluminum phosphate) was added to render the mix workable. A hydraulic press was employed to form specimens in the shape of discs 1¼ inches in diameter and ¾ inch in thickness. Ingredients of each of the specimens are listed in Table I.

TABLE NO. I

| Mix Number | 1 | 2 | 3 | 4 | 5 |
|---|---|---|---|---|---|
| Wt. of Ground Zircon plus Alumina (grams) | 1362.0 | 1355.2 | 1348.8 | 1334.8 | 1307.6 |
| Wt. of Ground Magnesia (grams) | None | 6.8 | 13.6 | 27.2 | 54.4 |
| % MgO in dry ingredients | 0.0 | 0.5 | 1.0 | 2.0 | 4.0 |
| Aluminum Phosphate Solution Additive (grams) | 103 | 103 | 103 | 103 | 103 |

The discs so produced were dried at 265°F. overnight to develop enough mechanical strength so they could be handled without risk of breaking. The discs were then placed in a furnace and fired to 2900°F., held at this temperature for various amounts of time, removed, cooled, and the compounds present were determined by X-ray diffraction. Results obtained are listed in Table II.

TABLE II

| Time at 2900F. | Compounds | CHEMICAL COMPOUNDS PRESENT | | | | |
|---|---|---|---|---|---|---|
| | | Mix No.1 0.0% MgO | Mix No.2 0.5% MgO | Mix No.3 1.0% MgO | Mix No.4 2.0% MgO | Mix No.5 4.0% MgO |
| 1 Minute | Zircon | Major | Less than No. 1 | — | Less than No. 2 | Least |
| | $\alpha$-Al$_2$O$_3$ | Major | Major | — | Less than No. 2 | Least |
| | ZrO$_2$ | Trace | Minor | — | More than No. 2 | Most |
| | Mullite | None | None | — | Trace | Minor |
| | SiO$_2$ | None | None | — | None | None |
| 4 Hours | Zircon | Major | — | Minor | — | Trace |
| | $\alpha$-Al$_2$O$_3$ | Major | — | Minor | — | Less |
| | ZrO$_2$ | Minor | — | More than No. 1 | — | Moderate |
| | Mullite | Trace | — | Minor | — | Moderate |
| | SiO$_2$ | None | — | None | — | None |
| 8 Hours | Zircon | Major | Less | Less | Minor | Trace |
| | $\alpha$-Al$_2$O$_3$ | Major | Less | Less | Same as No. 3 | Same as No. 3 |
| | ZrO$_2$ | Minor | More than No. 1 | More than No. 2 | More than No. 3 | Major |
| | Mullite | Minor | More than No. 1 | More than No. 2 | More than No. 3 | Moderate |
| | SiO$_2$ | None | None | None | None | None |

The use of X-ray diffraction analysis of similar discs fired to 2500°F. for eight hours resulted in a showing of a slight decrease in zircon content from Mix No. 1 through Mix No. 5. Similar tests at lower temperatures exhibited no chemical reactions. It should be noted here that X-ray diffraction will not disclose the presence of substances which are not crystalline. We believe therefore that all or nearly all these specimens probably contain some non-crystalline silica even though X-ray diffraction showed 'none' present.

Therefore, it can be seen that: (1) even after firing either hours at 2900°F. virtually no formation of mullite occurred unless magnesite (magnesium oxide) was present, (2) the more magnesite present the more complete was the reaction to form mullite, (3) as soon as any silica was liberated from the zircon it reacted rapidly to form mullite. In all examples, where the amount of reaction was measurable, mullite was formed.

Refractories made from fused zircon grain and tabular alumina aggregate or grog and using the bonding system of this invention exhibit hot strengths which are equal to comparable commercial refractory brick which has been pre-fired to high temperatures before testing and superior to those same refractories which had not been pre-fired before testing.

The following example shows the bonding of a commercial refractory.

EXAMPLE NO. 2

The following dry ingredients were intimately mixed (U.S. Standard Sieves):

| Alumina grains sized | $-16$ + 30 mesh | 23.5% |
|---|---|---|
| | $-16$ mesh | 36.5% |
| Alumina grains sized | $-325$ mesh | 21.6% |
| Silica grains sized | $-325$ mesh | 11.6% |
| Zircon grains sized | $-200$ mesh | 5.6% |
| Dead Burned Magnesite (96% MgO) | $-200$ mesh | 1.2% |

To this was added a sufficient amount of a commercial aluminum phosphate solution so that the grains could be consolidated readily. Samples 1.125" in diameter and 0.4" thick were pressed at 10,000 psi. These were fired to 2730°F., 2930°F., 3080°F. and 3200°F., and held at each temperature for one hour. There was no evidence of any permanent linear change. X-ray diffraction studies showed that all samples fired to 2900°F. or higher temperatures consisted of mullite, 3(Al$_2$O$_3$) . 2(SiO$_2$), alumina (Al$_2$O$_3$), and zirconia. It would seem probable that other compounds were present, but their amounts were too small to be detected by the X-ray methods used or they were non-crystalline. In the case of the magnesite, it probably became an indistinguishable part of the zirconia (baddeleyite) crystal structure.

EXAMPLE NO. 3

The composition of Example No. 2 was shaped into 1 inch by 1 inch by 9 inch bars and pressed at 5000 psi. The samples were then dried for five hours at 265°F. and five of each of these specimens were tested under the conditions indicated in the following table. Two presently available products, one with a mullite bond not formed by catalytic action as described in this patent application and one with a calcium aluminate bond, were used to prepare an identical set of bars and tested under the same conditions. Results of this testing show a clear superiority of our refractory over those currently available to the industry, as seen in the following tables.

|  | Catalytic Mullite Bond | Ordinary Mullite Bond | Calcium Aluminate Bond |
|---|---|---|---|
| Composition — Dry | | | |
| $Al_2O_3$ | 82.0% | 87.2% | 96.5% |
| $ZrO_2$ | 5.0% | — | — |
| $SiO_2$ | 11.8% | 11.2% | 2.7% |
| MgO | 1.2% | — | — |
| Cold Modulus of Rupture After Heating to Indicated For 5 Hours: | | | |
| 265F | 1795 psi. | 291 psi. | 1011 psi. |
| 800F | 2155 psi. | 211 psi. | 594 psi. |
| 1600F | 2300 psi. | 713 psi. | 697 psi. |
| 2300F | 2835 psi. | 697 psi. | 605 psi. |
| 2900F | 2830 psi. | 1125 psi. | 797 psi. |
| Hot Modulus of Rupture at Temperatures Indicated. Not Pre-Fired: | | | |
| 1700F | 2365 psi. | 1010 psi. | 460 psi. |
| 2300F | 590 psi. | 330 psi. | 260 psi. |
| 2800F | 225 psi. | 150 psi. | 130 psi. |
| Linear Thermal Expansion — 750 to 2900F — in./ft./°F. | | | |
|  | $6.3 \times 10^{-4}$ | $7.2 \times 10^{-4}$ | $6.1 \times 10^{-4}$ |
| Deformation under 25 psi. Load at 2840F: | | | |
| Green | 0.8% | 1.4% | 1.8% |
| Fired | 0.8% | 1.0% | 1.8% |
| True Porosity — Rammed and Dried Specimens: | | | |
|  | 11.8% | 19.2% | 18.3% |
| Formed Density: | | | |
|  | 192 lb/cu. ft. | 177 lb/cu. ft. | 172 lb/cu. ft. |
| Shrinkage After Firing at 3200F: | | | |
|  | 0.0% | 0.0% | 0.3% |

The foregoing data shows that the catalytic bonded mullite refractory of this invention is particularly resistant to thermal spalling because of the high strength at all temperatures and the normal linear thermal expansion characteristics.

Also, the catalytic mullite-bonded refractory of this invention has substantially lower porosity than either of the two typical commercial refractories shown. At 3200°F., it quickly glazes, thus closing virtually all the open pores. Neither of the other refractories exhibit this quality. This, of course, is indicative of the fact that it has excellent resistance to penetration of many metals and slags.

From the foregoing data it should be apparent that we have produced a refractory composition which can be pressed, rammed, gunned, cast or otherwise emplaced in a furnace or other pyro-processing unit and then can be dried and fired at ordinary furnace operating temperatures to provide a strong, dense and stable mass, exhibiting high refractoriness and resistance to erosion, thermal shock and penetration by molten slag and metal.

Typical uses for such a refractory are to form linings for ladles, runners, spouts, induction furnaces, as well as ladle nozzle wells, 'delta' sections of electric arc furnace roofs, tundish linings and other applications in pyro-processing. Where there is a need for a monolithic structure and/or where the shape of the mass is such that laying of fired refractory brick is impractical, the catalytic mullite bonded refractory of this invention can be applied.

This invention comprises an easy to use refractory from relatively inexpensive materials which develops useful properties when fired no higher than normal operating temperatures. In many cases it need only be thoroughly dried at temperatures on the order of 265°F. prior to use as the high strength at these lower temperatures is sufficient to hold the refractory grains together during the process of increasing temperatures as the pyro-processing unit is put into normal use. This, of course, eliminates the cost of fuel or electricity to 'burn in' such structures.

This invention is intended to cover all changes and modifications of the examples of the invention herein chosen for purposes of the disclosure, which do not constitute departures from the spirit and scope of the invention.

What is claimed is:

1. A refractory composition comprising:
   A. from about 30% to about 80% inactive refractory grain aggregate,
   B. from about 6% to about 20% zircon,
   C. from about 0.5% to about 10% alkaline earth oxide catalyst,
   D. from about 5% to about 45% alumina, and
   E. finely ground silica in amount sufficient to prevent formation of low melting alumina-zircon compounds, said silica being present in amount of at least about 5%.

2. The composition of claim 1 wherein the zircon is about 90% to about 100% smaller than 200 mesh and the alumina is about 90% to about 100% smaller than 325 mesh.

3. The composition of claim 1 wherein the inactive refractory grain is selected from the group consisting of zirconia, fused zirconia-alumina-silica, pyrophyllite, fused alumina, fused mullite and mixtures thereof.

4. The composition of claim 1 wherein the alkaline earth oxide catalyst is selected from the group consisting of magnesium oxide and calcium oxide.

5. The composition of claim 2 wherein the amounts of alumina and zircon are selected to provide an alumina-silica molar ratio of about 3 to 2.

6. A method of making a chemically bonded refractory object comprising the steps of
   a. combining about 30% to about 80% inactive aggregate refractory grains, about 6% to about 20% zircon, about 5% to about 45% alumina, finely ground silica in amount sufficient to prevent formation of low melting alumina-zircon compounds, said silica being present in amount of at least about 5%, and about 0.5% to about 10% alkaline earth oxide catalyst with a binder,
   b. forming the mixture into a refractory object and heating at a temperature below the melting point of mullite and for a time sufficient so that the zircon degrades under the catalytic action of the alkaline earth oxide to yield zirconia and silica and said silica combines with the alumina present in the mixture to form a mullite bond.

7. The method of claim 6 wherein the inactive refractory grain is selected from the group consisting of zirconia, fused zirconia-alumina-silica, pyrophyllite, fused alumina and fused mullite.

8. The method of claim 6 wherein the alkaline earth oxide catalyst is selected from the group consisting of magnesium oxide and calcium oxide.

* * * * *